United States Patent Office 3,125,437
Patented Mar. 17, 1964

3,125,437
METHOD OF BRIQUETTING IRON ORES
James E. Moore, Mount Lebanon Township, Allegheny County, and Donald H. Marlin, Pittsburgh, Pa., assignors to Dravo Corporation, Pittsburgh, Pa., a corporation of Pennsylvania
No Drawing. Filed Apr. 10, 1962, Ser. No. 186,358
13 Claims. (Cl. 75—3)

This invention relates to the treatment of iron ores in finely divided state and is particularly concerned with methods of converting finely divided natural iron ores and materials containing iron compounds such as oxides or mixtures thereof into lumps or briquettes suitable for use in conversion to metal by known processes.

The invention is particularly adapted for converting finely divided iron ores, blast furnace flue dust and other sources of iron and iron compounds in finely divided state into briquettes as a substitute for lump ore in the natural state.

The present natural resources of high grade lump ore are being rapidly depleted and industry is turning to the use of finely divided high grade ores as well as to finely divided lower grade ores which must be beneficiated before use. In addition to natural ores there are large quantities of blast furnace flue dust, scale and other sources of iron and iron compounds available in finely divided form for use in the iron and steel industry.

Such finely divided materials, in their present forms, are well known to be unsuited for economical use in conventional blast furnaces, open hearth and metallurgical furnaces, and many processes have been developed to agglomerate these finely divided forms of material to make them usable. Pelletizing and sintering by heating to high temperatures and bonding by hydraulic cement or other binders have been used.

Briquettes of finely divided ores and other finely divided materials have also been employed. Most of the known briquetting processes require the use of binders or long and expensive heating of the briquettes after formation so as to harden them in an attempt to resist handling shocks and abrasion during charging into the furnaces. Many such known briquettes employing binders crumble during heating in blast and open hearth furnaces and are converted back to finely divided condition resulting in high losses and inefficient melting conditions.

Briquetting is a well known process for agglomerating materials under pressure, with or without pre-heating. Natural ores of the magnetite, hematite and limonite groups which are the most readily available and have sufficient iron content for economical use, as well as the other aforementioned iron containing materials cannot be briquetted into durable shape retaining form by moderate heat and/or pressure alone. Usually they are admixed with some form of a binder and after pressing are subject to some form of heat treatment to bond the finely divided materials into a shape retaining mass suitable for handling and charging into the furnaces. The materials made by such methods are high in cost and require large investments in equipment in obtaining suitable daily production.

The present invention proposes a process for beneficiation of iron bearing compounds, including oxides, hydrated oxides and carbonated oxides, comprising heating and partially reducing such compounds by a suitable reductant for removal of a portion of the oxygen therefrom providing a product comprised of iron oxides and 0% to 10% metallic iron, then pressing the product at the lowest temperatures and pressures capable of providing agglomerates of a compact shape retaining gas permeable structure suitable for reduction to metal by known methods. The invention further proposes to provide a gas permeable briquette suitable for reduction to metal without disintegration, having a density of at least 3.0 g./cc.

The use of reductants does, however, impose certain temperature limitations in that minimum temperatures of reaction are required and maximum temperatures are those above which the particles become tacky and tend to adhere so as to cause difficulty in handling prior to briquetting. Since both the reductant and the oxide fines must flow freely through the reactor apparatus, practical temperature limitations between about 900° F. and about 2000° F. result. Additionally, the lower the temperature within the reactor, the lower the expense in heating both the gases and the ore fines.

The present invention thus seeks to employ minimum temperatures of reduction and minimum temperatures and pressures of compaction in the interest of economy. The maximum usable temperatures will be those below that at which the oxide particles become tacky to a degree so as to impede free flow through the reactor and free exposure to the reductant. The invention does not require briquetting at temperatures where tackiness at the surface of the particles occurs in the reactor.

In the present invention, we have discovered that by initial partial reduction of natural ores the resultant product can be readily briquetted under moderate heat and pressure into shapes which are equivalent to or superior to natural lump ores for handling and charging purposes. We have also discovered that such partially reduced ore can be used as a binder for the $Fe_2O_3$ and $Fe_3O_4$ natural forms of ore and other finely divided iron bearing compounds in forming suitable briquettes. Such forms of briquetted ore can be reduced to metal in conventional furnaces.

Natural magnetite ($Fe_3O_4$) ore fines when heated to temperatures upwardly to 1500° F. and pressed at upward to 100,000 p.s.i. were not found to briquette satisfactorily. Likewise, natural hematite ($Fe_2O_3$) ore fines at the same range of temperatures and pressures did not form satisfactory briquettes. Natural magnetite ore fines as well as natural hematite ore fines when heated to temperatures upwardly to 2000° F. and pressed at upwardly to 100,000 p.s.i. do not provide the briquette strength obtainable with the herein described invention.

Hematite ore fines when partially reduced to the $Fe_3O_4$ form of oxide by means of a suitable reducing agent and at temperatures below fusion can be subsequently briquetted at pressures of between 10,000 and 80,000 p.s.i and at temperatures between 700° F. and 1300° F. to produce a briquette which withstands handling and charging into the furnace and can be reduced to metal in the furnace without material change in form or excessive dusting. In like manner, when natural hematite or magnetite ore fines are partially reduced to the FeO form of oxide (Wustite) by means of a suitable reductant and briquetted at pressures between 10,000 and 80,000 p.s.i. and at temperatures between 700° F. and 1300° F. briquettes are produced which have improved strength and are capable of being handled and charged into the furnace and reduced to metal without material change in form or excessive dusting.

No binder need be added to the partially reduced ore to obtain satisfactory briquettes. In many cases skin or mere surface reduction of the ore fines has been found satisfactory, without the necessity for partial reduction of the entire mass of the ore particle. No limitation as to particle size of the ore being pressed has been established. Material passing a 2 mesh screen down to below 100 mesh screen (U.S. Std.) has been found to establish satisfactory briquettes. Suitable amounts of fines are desirable where the coarser particle sizes are used, in order to fill the voids and to provide optimum density in the briquette.

Hematite ores, reduced to the magnetite form of oxide ($Fe_3O_4$) may be referred to herein as synthetic magnetite to distinguish from the natural $Fe_3O_4$ form of oxide known as magnetite. Synthetic magnetite has excellent bonding characteristics under the conditions of temperature and pressure of the present process. When the synthetic magnetite is mixed with natural magnetite or natural hematite fines and the mixture briquetted at moderate temperature and pressure, the resulting briquette had correspondingly much greater strength than those formed wholly from natural magnetite or natural hematite. The strength of the briquettes increased in almost direct proportion to the amount of synthetic magnetite present in the mixture. The crushing strengths of wholly synthetic magnetite briquettes are subject to variation depending on the grade of ore used.

Microscopic examination of ore fines reveals that the particles are irregular in shape and when compacted during briquetting only the interfaces of the contacting particles cohere. Thus, the term "synthetic magnetite" as used herein includes hematite ore particles which are wholly or only partially reduced to magnetite and the cohesion is effected only by the particle portions in contact.

The additions of metallic Fe and/or FeO to the synthetic magnetite have been observed to increase the bonding characteristics above that of the synthetic magnetite as described herein. The FeO referred hereto is sometimes referred to as "Wustite."

We have discovered that partially metallized ores also serve as a suitable binder in briquetting finely divided natural hematite and magnetite form of ores and also serve to increase the strength of briquettes formed from or containing partially reduced ($Fe_3O_4$) forms of ore. Commercial forms of partially metallized ores can contain varying percentages of metallic Fe and FeO, depending upon the extent and conditions under which the metallizing process is completed. Investigation has indicated that the oxide FeO, as well as metallic iron, is responsible for the increased cohesion between the ore particles.

Additions of iron bearing compounds, with the iron in the metallic and/or FeO forms, to natural hematite and magnetite ore fines before heating and pressing into briquettes increases the bonding power above that of the natural ores. The conversion of the natural hematite to synthetic magnetite in the presence of metallic Fe and FeO, at the temperatures of the process, appears to result in partial oxidation of the metallic Fe and FeO. Mixtures of natural hematite ores and metallized ore in amounts sufficient to reduced all the hematite to synthetic magnetite provides strong briquettes under the process. When, however, the metallized ore, comprised of metallic Fe and FeO, is in excess of the calculated amount necessary to reduce all the hematite to synthetic magnetite, the resultant briquettes have increased resistance to crushing. A microscopic examination of such strong briquettes that were produced from a mixture initially containing FeO and less than 3% metallic iron revealed the presence of FeO and little or no metallic Fe, indicating that excess FeO increased the cohesion above that of the synthetic magnetite. It follows that this characteristic of FeO can be taken advantage of by partial or complete reduction of the natural hematite or magnetite ores to the FeO form of oxide for briquetting. Some metallization of the ore may occur in the process of reduction to FeO, which also can be beneficial to the briquetting operation.

Briquettes of synthetic magnetite fines, or mixtures of synthetic magnetite with natural hematite and magnetite or fines and/or other iron bearing compounds, or with partially metallized ore in the manner above described were found to be permeable to gases. For example, ⅜ inch thick briquettes were placed in a 1200° F. furnace for 7 minutes followed by air quenching, and when broken were found to be completely oxidized. They were also found to have increased resistance to crushing after oxidation.

The reducing agents used may be gaseous or solid. CO, $H_2$ and other known gaseous reducing agents have been found to be satisfactory and carbon in the form of starch when added to the hematite ores in amounts up to 4% by weight, which is slightly more than the amount that has been calculated for conversion of hematite $Fe_2O_3$ to magnetite $Fe_3O_4$ $$36Fe_2O_3 + C_6H_{10}O_5 \rightarrow 24Fe_3O_4 + 6CO_2 + 5H_2O$$

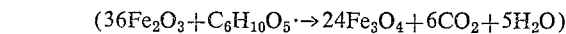

gave briquettes of good strength and which resisted abrasion well. Iron-FeO powder (for example 64% metallized), when used as a reductant gave high strength briquettes. When amounts of iron less than that necessary to convert all of the $Fe_2O_3$ to $Fe_3O_4$ were used, the briquette strength was comparable to that produced using equivalent amounts of starch. When iron-FeO powder containing 3 to 10 percent of metallic iron in excess of that required to reduce the hematite to magnetite form was used the strength of the briquettes was considerably increased. When 4 percent by weight of granular calcium carbonate was added to the material being briquetted, the briquettes retained their strength. The inclusion of such a calcium compound in the briquettes is a desirable feature for certain subsequent metallurgical operations.

Moisture in the ore is of no advantage in the present process. The temperatures at which the hematite ores are reduced to magnetite are sufficient to remove all contained water and water of crystallization. Since the ore is pressed while hot the ore and/or iron bearing compounds will be dry. Briquettes formed by the present process, using particle size within the ranges given and embodying sufficient fines, were found to have a dense compact gas permeable structure possessing high strength and resistance to abrasion and dusting.

EXAMPLE I

A medium grade hematite ore, having a typical analysis (dry) of 56% iron, 12% silica and 7% ignition loss, when reduced to $Fe_3O_4$ form of oxide was briquetted at 1150° F. and 20,000 p.s.i. The resultant briquette withstood a 16 ft. drop test without fracture.

EXAMPLE II

A medium grade hematite ore, was mixed with 2.4% by weight of starch, the amount calculated to completely reduce the $Fe_2O_3$ form of oxide to $Fe_3O_4$ form of oxide and briquetted at 1150° F. and 20,000 p.s.i. The resultant briquette withstood a 15 ft. drop test without fracture. Examination showed no apparent $Fe_2O_3$ or starch in the briquette.

EXAMPLE III

High grade ore (hematite) when reduced to $Fe_3O_4$ and briquetted at 1150° F. and at 20,000 p.s.i. gave superior compaction over similarly reduced medium grade hematite ore and withstood drop tests up to 20 ft. without fracture.

EXAMPLE IV

A medium grade hematite ore when mixed with iron-FeO powder (64% metallized) in percentages up to substantially that to convert all the ore to $Fe_3O_4$ and reacted, when briquetted at about 1150° F. and at 20,000 p.s.i. gave briquettes of substantially the same strength as Example I. When the Fe-FeO content was increased to between 3 and 10% greater by weight than the amount required to reduce all the $Fe_2O_3$ to $Fe_3O_4$, the resultant briquettes had excess strength over that obtained in Example I. When the example was repeated with a high grade hematite ore, superior briquettes were formed.

EXAMPLE V

Various percentages of natural ores are mixed with varying percentages of hematite reduced to substantially 100% synthetic magnetite and briquetted at 1150° F. and 15,000 to 20,000 p.s.i., the resultant briquettes increased in strength in proportion to the percentages of synthetic magnetite used.

When the foregoing examples were repeated with a commercial roll type briquetting machine, capable of providing roll pressures up to 80,000 pounds, the foregoing results were substantially duplicated.

EXAMPLE VI

For the purpose of studying the nature of the bonds which bind the ore particles together, microscopic examination of the reduced ore particles before and after briquetting were made upon numerous hematite and magnetite ores and miscellaneous iron bearing dusts. Ore particles were examined by imbedding them in Bakelite and subsequent polishing with diamond dust. Briquette cross-sections were prepared by impregnation with methyl methacrylate monomer, polymerizing the monomer, imbedding the impregnated briquette in Bakelite and polishing with diamond dust. The polished sections were examined with reflected light in a metallurgical microscope. The oxides $Fe_2O_3$ and $Fe_3O_4$ were readily distinguishable by color differences and FeO was readily distinguishable from $Fe_3O_4$ after use of an HCl—$SnCl_2$ etch which darkened the Wustite (FeO) phase.

Microhardness readings were taken on both the partially reduced ore particles and the briquettes, with a Tukon hardness tester using a diamond Knoop indenter using loads of 25 to 100 grams. Since loads under 500 grams gave less than the true hardness of the particles, the results were corrected to a base Knoop hardness value obtained with 500 gram loads and such values were then converted to an equivalent Brinell hardness number from available conversion tables. Several specimens of similar oxides were tested and gave the following readings:

*Knoop Hardness of Iron Oxides*

|  | Std. harness |
|---|---|
| Natural specular hematite ($Fe_2O_3$) | 719–1000 |
| Natural earthy hematite ($Fe_2O_3$) | 773–1000 |
| Natural magnetite ($Fe_3O_4$) | 422–513 |
| Synthetic magnetite (from specular hematite) | 378–460 |
| Wustite (FeO) from natural magnetite | 282–428 |

From the foregoing it is evident that both natural and synthetic magnetite are softer and, therefore, more ductile than hematite and that Wustite is the softest of the oxides and probably the most malleable.

No attempt was made to measure hardness at elevated temperatures, but observations indicate that all of these oxides become softer and more plastic at higher temperatures. This was evident from the briquette specimens.

When compacting forces were applied to reduced oxides at elevated temperatures, the softer more reduced oxides more readily welded together and developed more stronger bonds between oxide particles than the harder, more brittle, less malleable natural oxides. The softening, improved ductility, greater malleability, and better weldability of the reduced oxides of iron ore are the principle factors which yield strongly bonded briquettes which will not disintegrate with subsequent heating.

EXAMPLE VII

| Briquette No. | Wt. percent Specular Hematite, $Fe_2O_3$ | Wt. percent Synthetic Magnetite, $Fe_3O_4$ | Wt. percent Wustite, FeO | Crushing Strength, Pounds | Density, Gr./cc. |
|---|---|---|---|---|---|
| 1 | 100 | 0 | 0 | 250 | 4.2 |
| 2 | 0 | 100 | 0 | 950 | 4.2 |
| 3 | 0 | 75 | 25 | 1,350 | 4.5 |

Example VII illustrates the change in strength and density of briquettes formed from a natural specular hematite ore which was partially reduced in varying degrees at about 1500° F. to produce correspondingly different amounts of the various reduced oxides. All these briquettes were formed at the same temperature (1350° F. to 1400° F.) and with the same pressure (73,000 p.s.i.).

EXAMPLE VIII

| Briquette No. | Wt. percent Specular Hematite, $Fe_2O_3$ | Wt. percent Synthetic Magnetite, $Fe_3O_4$ | Wt. percent Wustite, FeO | Crushing Strength, Pounds | Density, Gr./cc. |
|---|---|---|---|---|---|
| 1 | 100 | 0 | 0 | 1,120 | 4.2 |
| 2 | 20 | 80 | 0 | 1,210 | 4.2 |
| 3 | 0 | 80 | 20 | 1,820 | 4.5 |

In like manner Example VIII illustrates the comparative results obtained when a natural specular hematite ore was heated and partially reduced in varying degrees to produce correspondingly different amounts of the various oxides at 1850° F. and briquetted at approximately the same temperatures (1400° F. to 1550° F.) and using the same pressures (73,000 p.s.i.). This example also shows the effect of varying the amount of reduction and briquetting at somewhat higher temperature than Example VII.

EXAMPLE IX

| Briquette No. | Wt. Percent Natural Magnetite, $Fe_3O_4$ | Wt. Percent Wustite, FeO | Crushing Strength, Pounds | Density, Gr./cc. |
|---|---|---|---|---|
| 1 | 100 | 0 | 580 | 4.2 |
| 2 | 75 | 25 | 1,500 | 4.5 |

This example illustrates the change in strength and density of briquettes formed from a natural magnetite ore when partially reduced at less than 1550° F. to increase the amount of the lower oxide Wustite (FeO). These briquettes were formed with the same temperature (1125° F.–1275° F.) and the same pressure (60,000 p.s.i.).

Various experiments based upon increased roll pressure, increased briquetting temperature or both when using partially reduced oxide fines containing $Fe_3O_4$ and FeO were conducted. As was expected, the synthetic magnetite ($Fe_3O_4$) briquettes increased in strength as the pressure and temperature was increased. A greater strength increase was found in the briquettes containing the partially reduced oxide form FeO, due to such oxide being more malleable and softer than $Fe_3O_4$.

Also, increasing pressure with the temperature remaining constant or increasing temperatures with the pressure remaining constant resulted in increased density. This density increase was also greater as the amount of small fines in the briquette increased. For some purposes, as in blast furnace use, porosity is an advantage in penetration of the reduction gases. Hence, maximum porosity accompanied by sufficient resistance to crushing strength and dusting is the goal. These characteristics are of lesser importance when the briquette is reduced to metal in a melting furnace. As disclosed in the above examples density 4.5 g./cc. were obtained and in other cases 5.0 g./cc. were obained.

Our search in this invention was to obtain satisfactory briquettes at lowest practical temperatures. For maximum economy partial reduction may be carried out in a fluid bed type of reactor or in a so-called "flash reactor" where only skin reduction of an ore particle is obtained and the core of the particle is of a higher oxide form. These processes are generally limited to operating temperatures between 900° F. to 2000° F., since increased tackiness of the particles at elevated temperatures retards the process.

The use of a roll type briquetting machine is generally considered the most economical for obtaining a desired production in a given time period. To restrict re-oxidation of the partially reduced ore particles they are preferably charged directly to the machine from the reactor.

The included examples herein are seeking minimum briquetting temperatures and pressures. Obviously for a given temperature of the ore particles received in the rolls, an increase of pressure within certain limits tends to provide increased briquette strength and density. On the other hand, a given oxide form of ore received in the roll pocket can be satisfactorily briquetted at lower pressures as the temperature is increased.

The degree of reduction, temperature, pressure and particle size range can be varied, within the ranges given, with each iron ore and other iron oxide forms so as to obtain the desired briquette characteristics at minimum costs.

This application is a continuation-in-part of our copending application Serial No. 775,434, filed November 21, 1958, now abandoned.

We claim:

1. The process for the beneficiation of hematite ore fines comprising heating and partially reducing said ore fines at temperatures below 1500° F. in the presence of a suitable reductant to provide synthetic magnetite fines, and pressing said fines with contacting partially reduced interfaces into briquettes at pressures between 10,000 and 80,000 p.s.i. and temperatures between 700° and 1300° F.

2. The process for beneficiation of hematite ore fines, comprising the steps of heating and partially reducing said fines at temperatures below 1500° F. in the presence of a suitable reductant to provide a product containing the oxide form $Fe_3O_4$, then pressing said heated partially reduced fines with contacting partially reduced interfaces into briquettes at temperatures between 700° F. and 1300° F. and at pressures above 10,000 p.s.i.

3. The process as defined in claim 2 wherein the reductant is metallic iron.

4. The process as defined in claim 2 wherein the reductant is FeO.

5. The process as defined in claim 2 wherein the reductant is iron bearing compounds with the iron in Fe and FeO forms and containing 3 to 10% metallic Fe in excess of that required to reduce the hematite to magnetite form.

6. The process as defined in claim 2 wherein the reductant is a gas.

7. The process as defined in claim 2 wherein the partially reduced hematite fines are mixed with other similarly heated ore fines wherein the partially reduced hematite fines comprise at least 25% of the mixture being briquetted.

8. The process for forming compact gas permeable briquettes suitable for handling and charging into furnaces for reduction to metal without material change in shape and excessive dusting, comprising the steps of heating iron oxide fines to temperatures between 700° F. and 1500° F. in the presence of a suitable reductant and partially reducing said fines into oxide forms containing $Fe_3O_4$, and pressing the said heated fines with contacting partially reduced interfaces into briquettes at pressures greater than 10,000 p.s.i. and at temperatures between 700° F. and 1300° F.

9. The process for forming compact gas permeable briquettes suitable for handling and charging into melting furnaces, comprising the steps of heating iron ore fines at temperatures below 1500° F. in the presence of a suitable reductant to partially reduce the fines to lower oxide forms containing FeO, and pressing said heated fines with contacting partially reduced interfaces into briquettes at pressures greater than 10,000 p.s.i. and temperatures between 700° F. and 1300° F.

10. The process for forming compact gas permeable briquettes suitable for handling and charging into furnaces comprising the steps of heating to temperatures below 1500° F. hematite and magnetite forms of ores mixed with partially metallized ores in amounts sufficient to partially reduce at least 25% of the ore in the mixture to a lower oxide, then pressing the partially reduced mixture into briquettes at pressures above 10,000 p.s.i. and at temperatures between 700° F. and 1300° F.

11. The process for forming gas permeable briquettes suitable for handling and charging into furnaces for reduction to metal without material change in shape and excessive dusting comprising heating iron oxide fines to temperatures below fusion in the presence of a suitable reductant to partially reduce the iron oxide fines to lower oxide forms by removal of oxygen therefrom then pressing the resultant heated iron oxide product with contacting partially reduced interfaces at pressures above 10,000 p.s.i. and at temperatures above 700° F.

12. The process for forming compact briquettes having a density between 3 and 5 grams/cc. suitable for handling and charging into furnaces for reduction to metal without excessive dusting comprising heating and partially reducing iron oxide fines to lower iron oxide forms at temperatures below fusion in the presence of a suitable reductant and then pressing the resultant heated product with contacting partially reduced interfaces at temperatures above 700° F. and at pressures between 10,000 and 80,000 p.s.i.

13. The process for forming briquettes suitable for handling and charging into furnaces for reduction to metal without excessive dusting comprising heating natural iron ore fines to temperatures below fusion in the presence of a suitable reductant to partially reduce the iron ore fines into lower oxide forms then pressing the resultant heated product with contacting partially reduced interfaces into briquettes at temperatures above 700° F. and pressures between 10,000 and 100,000 p.s.i.

References Cited in the file of this patent

UNITED STATES PATENTS

| | | |
|---|---|---|
| 1,792,413 | Christiansen | Feb. 10, 1931 |
| 2,668,105 | de John | Feb. 2, 1954 |
| 2,808,322 | Warrington | Oct. 1, 1957 |
| 2,816,016 | De Vaney | Dec. 10, 1957 |
| 2,864,686 | Agarwal | Dec. 16, 1958 |

UNITED STATES PATENT OFFICE
CERTIFICATE OF CORRECTION

Patent No. 3,125,437 March 17, 1964

James E. Moore et al.

It is hereby certified that error appears in the above numbered patent requiring correction and that the said Letters Patent should read as corrected below.

Column 3, line 73, for "or", first occurrence, read -- ore --; column 5, line 43, for "Std. harness" read -- Std. hardness --.

Signed and sealed this 4th day of August 1964.

(SEAL)
Attest:

ERNEST W. SWIDER
Attesting Officer

EDWARD J. BRENNER
Commissioner of Patents